(12) United States Patent
Lee et al.

(10) Patent No.: US 7,194,796 B2
(45) Date of Patent: Mar. 27, 2007

(54) METHOD FOR CREATING A MAGNETIC HEAD

(75) Inventors: Kim Y. Lee, Fremont, CA (US); Jih-Shiuan Luo, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 563 days.

(21) Appl. No.: 10/617,908

(22) Filed: Jul. 10, 2003

(65) Prior Publication Data

US 2005/0005427 A1   Jan. 13, 2005

(51) Int. Cl.
*G11B 5/127* (2006.01)
*G11B 5/33* (2006.01)
*B44C 1/22* (2006.01)

(52) U.S. Cl. .................. 29/603.12; 29/603.14; 29/603.15; 29/603.16; 29/603.18; 360/324.11; 216/22

(58) Field of Classification Search ............ 29/603.12, 29/603.16, 603.18, 603.14, 842, 846, 603.15; 360/324.11, 75, 66, 67, 46, 324.12, 324.1; 216/100, 75, 52, 22; 324/252
See application file for complete search history.

(56) References Cited

U.S. PATENT DOCUMENTS

| | | | |
|---|---|---|---|
| 5,583,725 A * | 12/1996 | Coffey et al. .......... 360/324.11 |
| 5,608,593 A * | 3/1997 | Kim et al. ............. 360/324.12 |
| 5,708,358 A * | 1/1998 | Ravipati ................ 324/252 |
| 5,978,183 A | 11/1999 | Hsiao et al. ........... 360/113 |
| 6,162,582 A | 12/2000 | Hsiao et al. ........... 430/312 |
| 6,219,207 B1 | 4/2001 | Pinarbasi .............. 360/322 |
| 6,570,745 B1 * | 5/2003 | Gill ..................... 360/324.12 |
| 2001/0001256 A1 | 5/2001 | Hsiao ................... 360/246.6 |
| 2001/0028537 A1 | 10/2001 | Gill ..................... 360/314 |

* cited by examiner

Primary Examiner—A. Dexter Tugbang
Assistant Examiner—Tai Van Nguyen
(74) Attorney, Agent, or Firm—Zilka-Kotab, PC (57) ABSTRACT

A magnetic head and method for forming the same. Leads are added to a wafer stack having a free layer, a bias layer, and a spacer layer between the free layer and bias layer. A gap is formed between the leads. A protective layer is added to the wafer stack such that the gap is covered, as well as facing ends of the leads. Material is removed from at least one side area of the wafer stack using the protective layer as a mask. The protective layer is removed. A portion of the bias layer below the gap is processed for reducing a magnetic moment of the bias layer in the portion of the bias layer below the gap for forming a sensor in which magnetic moments of end portions of the free layer are pinned by magnetic moments of end portions of the bias layer, and preferably antiparallel thereto.

27 Claims, 8 Drawing Sheets

METHOD FOR CREATING A MAGNETIC HEAD

FIELD OF THE INVENTION

The present invention relates to magnetic heads, and more particularly, this invention relates to read heads having magnetically pinned passive tab regions.

BACKGROUND OF THE INVENTION

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film layers that comprise the GMR read head is reduced below certain values, the magnetic properties of the layers are substantially compromised. To overcome this problem, GMR read heads have been developed in which the thin film layers have an ample width and the electrical leads are overlaid on top of portions of the thin film layers. This lead overlaid configuration has the effect of creating an active read head region having a width that is less than the entire width of the deposited layers, such that the magnetic properties of the thin film layers can be preserved. Thus, in the lead overlaid GMR read heads of the prior art, active magnetic layer portions exist between the electrical leads and passive magnetic layer portions exist beneath the electrical leads.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, create magnetic field fluctuation and noise within the passive regions of the free magnetic layer beneath the electrical leads. Thus, noise and side reading effects continue to be a problem with lead overlaid GMR read heads.

Further, prior art heads have hard bias material on either side of the sensor to exert magnetic force on the free layer to magnetically stabilize the free layer. The problem is that hard bias layers are very thick, and as track sizes shrink, sensors must get smaller. When the track width becomes very narrow, the hard bias layers make the free layer very insensitive and thus less effective. What is needed is a way to create a sensor with a narrow track width, yet with a free layer that is very sensitive

SUMMARY OF THE INVENTION

The present invention overcomes the drawbacks and limitations described above by providing a magnetic head and method for forming the same. According to the method, leads are added to a wafer stack having a free layer, a bias layer, and a spacer layer between the free layer and bias layer. A gap is formed between the leads. Note that the leads can be added to the wafer stack by an additive process, by reactive ion etching, etc.

A protective layer is added to the wafer stack such that the gap is covered, as well as facing ends of the leads. Preferably, the protective layer includes a resist undercoat and a second layer of resist above the resist undercoat. A developer can be applied to the resist undercoat for removing a portion of the resist undercoat such that opposite ends of the resist undercoat along a plane parallel to an upper surface of the wafer stack are closer together than opposite ends of the second layer of resist.

Material is removed from at least one side area of the wafer stack using the protective layer as a mask, such as by ion milling, sputter etching, etc. Preferably, an edge of the at least one side area of the wafer stack after removing the material from the stack is oriented at an acute angle relative to a line perpendicular to a plane parallel to an upper surface of the wafer stack. Ideally, material is removed from both side areas of the wafer stack. Edges of the side areas of the wafer stack preferably taper towards each other in a direction away from the wafer stack after removing the material.

Lead material can be added to one or more side areas of the wafer stack.

The protective layer is removed, such as by a lift off process.

A portion of the bias layer below the gap is processed for reducing a magnetic moment of the bias layer in the portion of the bias layer below the gap for forming a sensor in which magnetic moments of end portions of the free layer are pinned by magnetic moments of end portions of the bias layer, and preferably antiparallel thereto. The magnetic moment of the bias layer can be reduced by oxidation, ion implantation, milling, etc., and preferably self-aligned oxidation, self-aligned ion implantation, self-aligned milling, etc.

The resulting magnetic head has no hard bias elements. End regions of the leads can be made to taper towards facing ends thereof. Additional layers may also be added.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
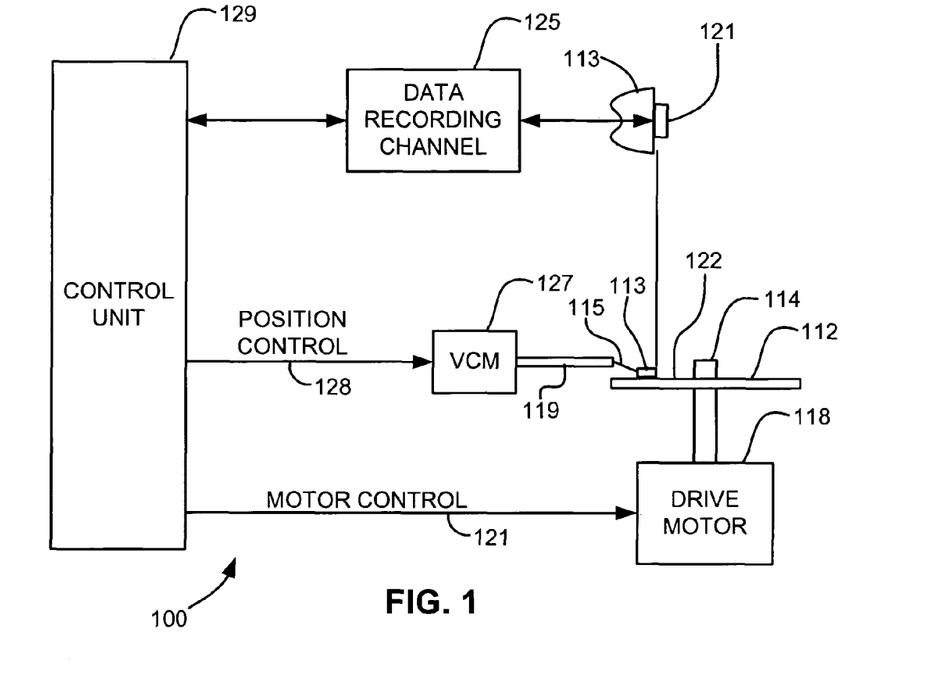
FIG. 1 is a perspective drawing of a magnetic disk drive system in accordance with one embodiment.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned adjacent to the disk 112, each slider 113 supporting one or more magnetic read/write heads 121. More information regarding such heads 121 will be set forth hereinafter during reference to FIG. 4. As the disks rotate, slider 113 is moved radially in and out over disk surface 122 so that heads 121 may access different tracks of the disk where desired data are recorded. Each slider 113 is attached to an actuator arm 119 by means way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
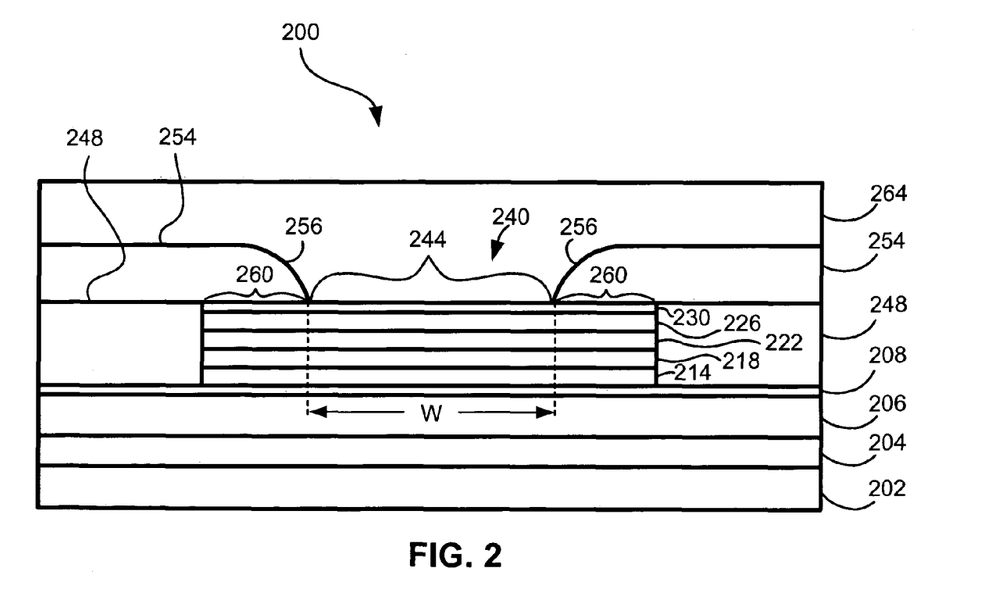
FIG. 2 is a side cross-sectional view of a prior art lead overlaid read head portion of a magnetic head.

FIG. 2 is a side cross-sectional view of a prior art electrical lead overlaid read head portion of a magnetic head 200. As depicted therein, the prior art lead overlaid read head generally includes a substrate base 202 that constitutes the material from which the magnetic head is fabricated, such as aluminum titanium carbide. A first magnetic shield 204 is fabricated on the substrate, and an insulation layer 206, typically composed of aluminum oxide, is fabricated upon the magnetic shield 204. A seed layer 208 is deposited upon the insulation layer 206 and a series of thin film layers are sequentially deposited upon the seed layer 208 to form a GMR read head. In this structure, the layers generally include an antiferromagnetic layer 214, a pinned magnetic layer 218 that is deposited upon the anti ferromagnetic layer 214, a spacer layer 222 that is deposited upon the pinned magnetic layer 218, a free magnetic layer 226 that is deposited upon the spacer layer 222 and a cap layer 230 that is deposited upon the free magnetic layer 226. Typically, the antiferromagnetic layer 214 may be composed of PtMn, the pinned magnetic layer 218 may be composed of CoFe, the spacer layer 222 may be composed of Cu, the free magnetic layer 226 may be composed of CoFe and the cap layer 230 may be composed of Ta.

Following the deposition of the GMR read head layers 214–230, a patterned etching process is conducted such that only central regions 240 of the layers 214–230 remain. Thereafter, hard bias elements 248 are deposited on each side of the central regions 240. Following the deposition of the hard bias elements 248, electrical lead elements 254 are fabricated on top of the hard bias elements 248. As depicted in FIG. 2, inner ends 256 of the leads 254 are overlaid on top of outer portions 260 of the layers 214–230 of the central read head layer regions 240. A second insulation layer 264 is fabricated on top of the electrical leads 254 and cap layer 230, followed by the fabrication of a second magnetic shield (not shown) and further components that are well known to those skilled in the art for fabricating a complete magnetic head.

A significant feature of the prior art lead overlaid GMR read head depicted in FIG. 2 is that the portion of the central layer region 240 which substantially defines the track reading width W of the read head 200 is the central portion 244 of the read head layer regions 240 that is disposed between the inner ends 256 of the electrical leads 254. That is, because the electrical current flows through the read head layers between the electrical leads 254, the active portion 244 of the read head layers comprises the width w between the inner ends 256 of the electrical leads 254. The outer portions 260 of the read head layers disposed beneath the overlaid inner ends 256 of the electrical leads 254 are somewhat passive in that electrical current between the electrical leads 254 does not pass through them.

A significant problem with the prior art lead overlaid read head 200 depicted in FIG. 2 is that the magnetization in the outer portions 260 of the free layer 226 beneath the electrical leads 254 is unstable and subject to unwanted magnetic field fluctuations. Additionally, side reading effects from adjacent data tracks as well as magnetic noise is created in the passive portions 260 of the free layer 226 beneath the electrical lead ends 256. Thus, noise and side reading effects continue to be a problem with lead overlaid GMR read heads.

Figure 3:
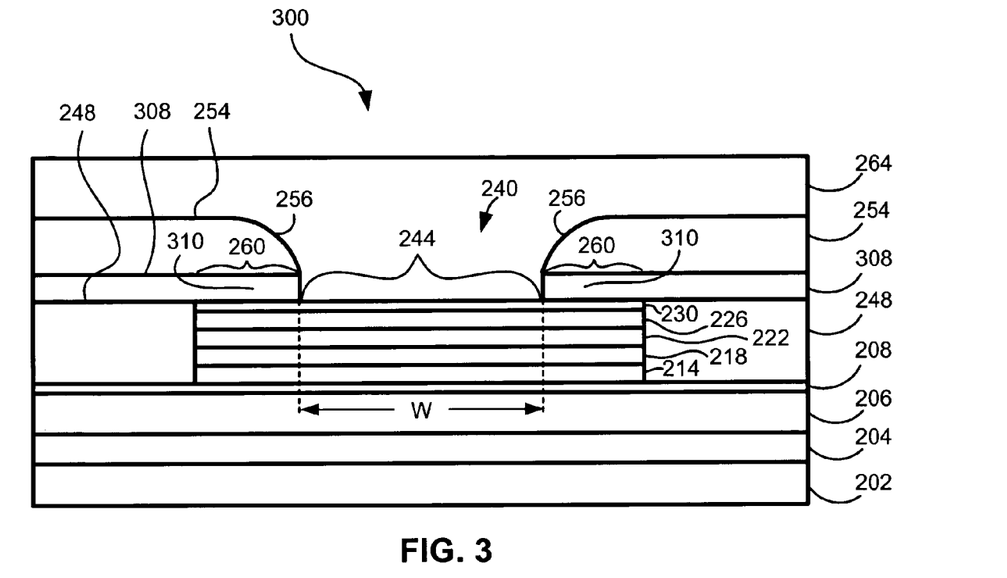
FIG. 3 is a side cross-sectional view of another prior art lead overlaid read head portion of a magnetic head.

FIG. 3 depicts another prior art lead overlaid read head 300. As depicted therein, the read head 300 includes a GMR read head thin film element 240, as well as the hard bias elements 248. This read head 300 includes an additional magnetic thin film layer 308 that is deposited on top of the hard bias elements 248, such that an inner portion 310 of the layer 308 extends over the outer portions 260 of the layers that comprise the read head element 240. The magnetic layer 308 is deposited on top of the outer portions 260 of the tantalum cap layer 230, and directly on top of the magnetic hard bias elements 248. The electrical leads 254 are thereafter fabricated on top of the magnetic layer 308.

Following the magnetic field initialization of the hard bias elements 248, the magnetic field of the hard bias elements 248 will create corresponding magnetic fields within the magnetic layer 308. Furthermore, because the inner portion 310 of the magnetic layer 308 is deposited on top of the outer portion 260 of the tantalum cap layer 230, which is deposited above the outer portion 260 of the free layer 226, the magnetic field within the inner portion 310 of the magnetic layer 308 will become magnetostatically coupled to the outer portion 260 of the free layer 226 through the tantalum cap layer 230. This provides a pinning effect upon the magnetic fields within the outer portion 260 of the free layer, because it raises the coercivity of the free layer within the outer region 260.

One drawback of the configuration depicted in FIG. 3 is that the additional layer 308 adds to the thickness of the head. Further, an additional processing step is required to add the magnetic layer 308.

Another drawback is that the prior art read heads 200,300 of FIGS. 2–3 require hard bias elements 248. As track sizes shrink, sensors must get smaller. The smaller the sensor becomes, the more susceptible it is to interference from the hard bias elements 248. When the track width becomes very narrow, the hard bias elements 248 make the free layer very insensitive and thus less effective.

Figure 4:
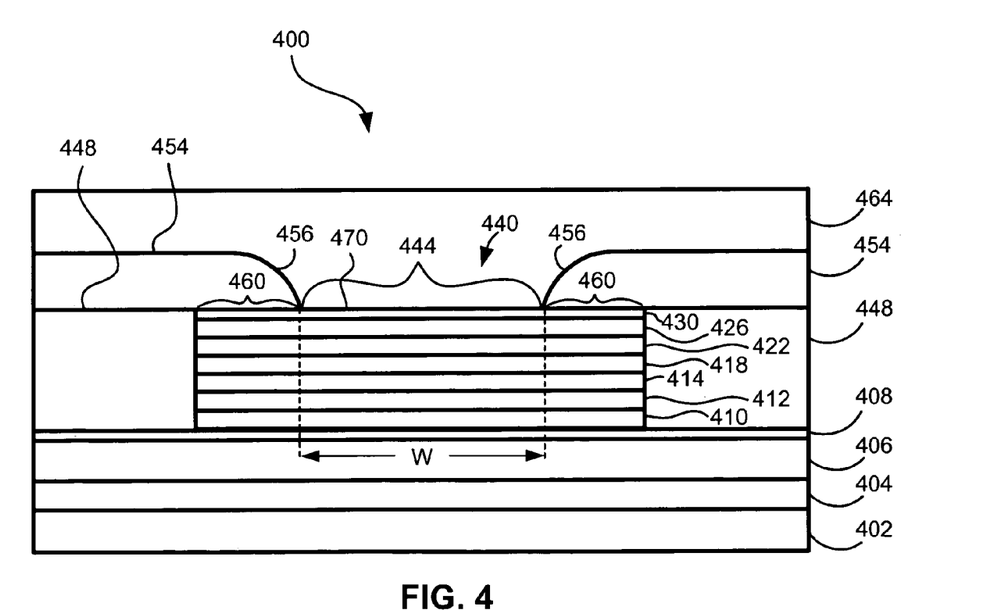
FIG. 4 is a side cross-sectional view of a first preferred embodiment of a lead overlaid read head portion of a magnetic head of the present invention.
Figure 5:
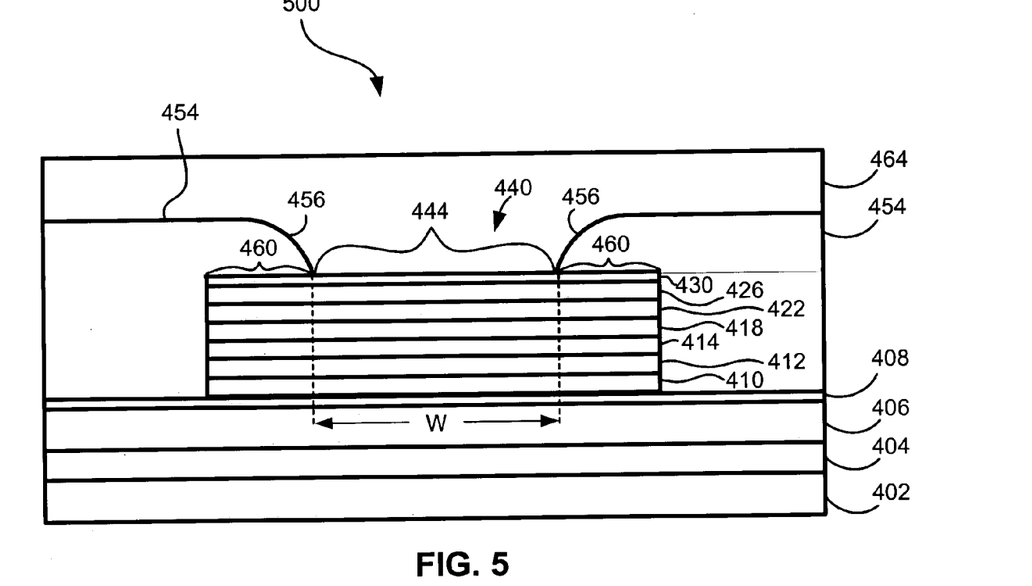
FIG. 5 is a side cross-sectional view of a second preferred embodiment of a lead overlaid read head portion of a magnetic head of the present invention.
Figure 6:
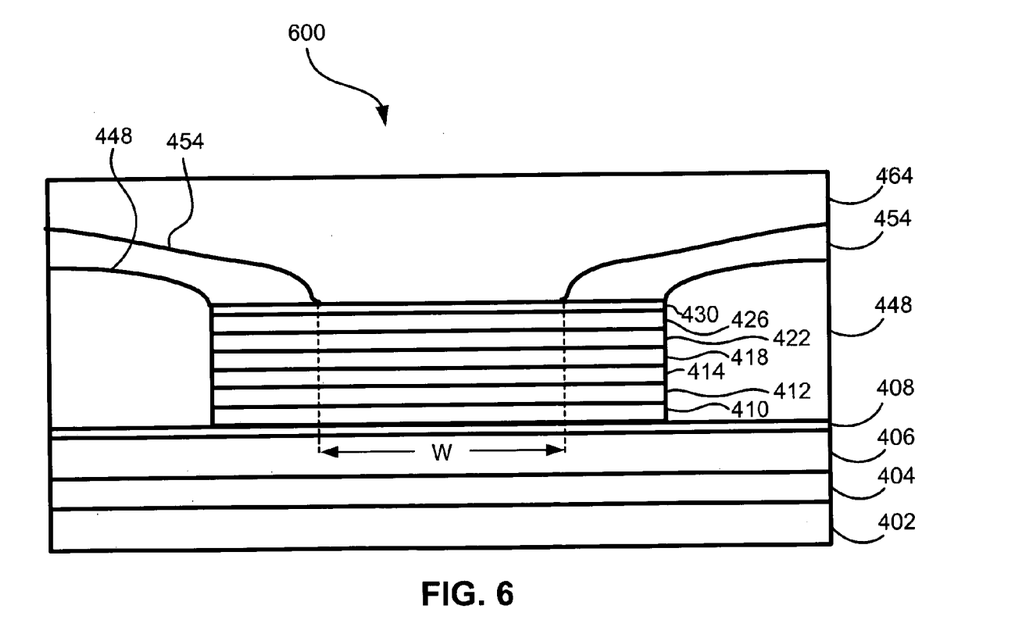
FIG. 6 is a side cross-sectional view of a third preferred embodiment of a lead overlaid read head portion of a magnetic head of the present invention.

The embodiments of the present invention described below with reference to FIGS. 4–6 provide better characteristics with fewer layers. These embodiments describe sensors with higher sensitivities than prior art sensors of comparable track reading width W.

FIG. 4 illustrates a lead overlaid read head 400 according to one preferred embodiment. As shown, the read head 400 includes a substrate base 402, a first magnetic shield 404 fabricated on the substrate, and an insulation layer 406 fabricated upon the magnetic shield 404. A seed layer 408 is deposited upon the insulation layer 406 and a series of thin film layers are sequentially deposited upon the seed layer 408 to form a GMR read head. In the preferred embodiment of the present invention, the layers generally include an antiferromagnetic layer 410, a lower pinned layer 412, a first spacer layer 414, a free magnetic layer 418 that is deposited upon the first spacer layer 414, a second spacer layer 422 that is deposited upon the free layer 418, a pinned magnetic layer 426 that is deposited upon the second spacer layer 422 and a cap layer 430 that is deposited upon the bias layer 426.

The first spacer layer 414 may be composed of Cu, Ru, etc. and the free layer 418 may be composed of CoFe, NiFe, FeN, Co, etc. The second spacer layer 422 may be composed of Cr, Ru, etc.; the bias layer 426 may be composed of CoFe, NiFe, FeN, Co, etc.; and the cap layer 430 may be composed of Ta. A preferred list of materials is provided below.

Whatever combination of materials is used, the magnetic moments of the free and bias layer 426 should be antiparallel. This can be achieved, for example by using Cr for the second spacer in a thickness about less than about 10 Å. The portion of the bias layer 426 in the active area 444 is oxidized to reduce its magnetic properties, thereby allowing the free layer 418 in the active area to spin freely. This allows the head to read track widths in the sub-micron range. Further, each overlap portion 460 can be much longer than the active portion 444 because the antiparallel coupling makes the overlap portions 460 insensitive.

Referring again to FIG. 4, following the deposition of the GMR read head layers 410–430, a patterned etching process is conducted such that only central regions 440 of the layers 410–430 remain. Following the etching, a filler 448 such as aluminum oxide is deposited on each side of the central regions. Note the distinction between the structure of the head 200 of FIG. 2, which requires hard bias elements, and the head 400 of FIG. 4, which does not. Thus, the head 400 of FIG. 4 is not susceptible to hard bias interference and therefore the active area 444 of the head 400 can have a very narrow track reading width W. Further, manufacturing costs and times are reduced by using filler.

Following the deposition of the filler 448, electrical lead elements 454 are fabricated on top of the filler 448 such that inner ends 456 of the leads 454 are overlaid on top of outer portions 460 of the layers 410–430 of the central read head layer regions 440. These outer portions can be referred to as antiparallel tabs.

Once the electrical lead elements 454 are added, they can be used as a mask. The cap layer 430 between the electrical lead elements 454 is removed by etching. After removing the cap layer 430, the exposed portion of the bias layer 426 is oxidized by any suitable method. For example, if the bias layer 426 is FeN, the result after oxidation is iron oxide ($FeO_x$). The oxidized portion of the bias layer 426 is magnetically inactive, having essentially no magnetic moment. The free layer 418 is thus able to spin freely in the active area 444, but is pinned in the overlap regions 460. This provides a further advantage, in that the oxidized portion of the bias layer 426 is also electrically resistive, and it is desirable to prevent flow of electricity through the bias layer 426 because of the resulting insensitivity. This configuration allows current to essentially flow only through the free layer 418.

Keep in mind that it is desirable to avoid oxidation of the free layer. During the oxidation step, the Cr second spacer layer 422 acts as a barrier to some extent.

With continued reference to FIG. 4, the portion of the cap layer 430 removed for oxidation of the bias layer 426 can be replaced. A second insulation layer 464 is fabricated on top of the electrical leads 454 and cap layer 430, followed by the fabrication of a second magnetic shield (not shown) and further components, such as a write portion, that are well known to those skilled in the art for fabricating a complete magnetic head.

FIG. 5 depicts an alternate embodiment 500 in which the electrical lead elements 454 are deposited adjacent the layers 410–430, thereby saving an additional processing step, namely that of depositing filler. Note that a nonconductive material (not shown) can be deposited between the side edges of the layers 410–430 and the electrical lead elements 454.

FIG. 6 depicts yet another magnetic head 600 in which the electrical lead elements 454 are tapered towards the sensor. If the electrical lead elements 454 are too thick, they create an electric contact (i.e., short) to the shield (not shown). This in turn interferes with head performance. The embodiment shown in FIG. 6 provides a thin electrical lead element 454 near the sensor. The dimensions of the electrical lead element 454 may increase away from the sensor.

In a preferred embodiment, the first spacer layer 414 is composed of Cu and the free layer 418 is composed of CoFe and FeN. The second spacer layer 422 is composed of Cr 8–10 Å thick. Cr is preferred because when a thin Cr layer is placed between two ferromagnetic layers, the magnetic moments of the layers become antiparallel. The bias layer 426 is composed of FeN, and the cap layer 230 is composed of Ta. The bias layer 426 is preferably mostly Fe with a small amount of N, e.g., 2–5%.

FeN is the preferred material for several reasons, though other materials such as NiFe can also be used. One reason FeN is the preferred material is because it oxidizes faster than NiFe and so the bias layer can be oxidized without oxidation of the free layer.

Magnetically, the layers 418,426 require a certain thickness to be effective. If NiFe is used for the bias layer 426, the bias layer 426 is about 25% thicker (as measured between the Cr and Ta layers 422,430) than the free layer 418. For example, if the free layer 218 is about 30 Å, the bias layer 426 is about 37 to 40 Å. FeN has about twice the magnetic moment of NiFe. Because FeN has twice the moment, an FeN bias layer 426 need only be half as thick as a layer of NiFe. Thus, in the foregoing example, the FeN bias layer would only need to be about 15–20 Å thick. A preferred thickness of the bias layer 426 is 50–80% less than the thickness of the free layer 418.

Also, as mentioned above, it is desirable to avoid oxidation of the free layer 218. The thinner FeN bias layer 426 is easier to oxidize, and oxidizes faster. Both of these make it safer to use without disturbing the free layer 418.

Figure 7:
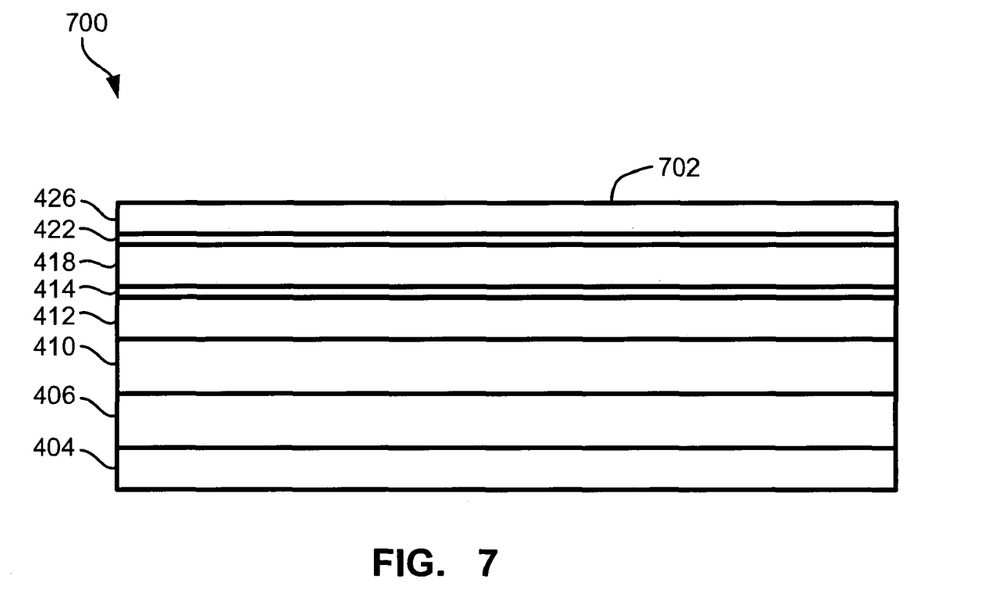
FIG. 7 illustrates a wafer stack according to one embodiment.

FIG. 7 illustrates a wafer stack 700 formed during a process for forming a lead overlay read head with antiparallel pinned tab regions 460, such as or similar to those shown above in FIGS. 4–6. As shown, the wafer stack 700 is fabricated up to the bias layer 426. A thin lead is patterned on or above the upper surface 702 of the bias layer 426, either directly on the bias layer 426 or on a cap layer (not shown).

Figure 8:
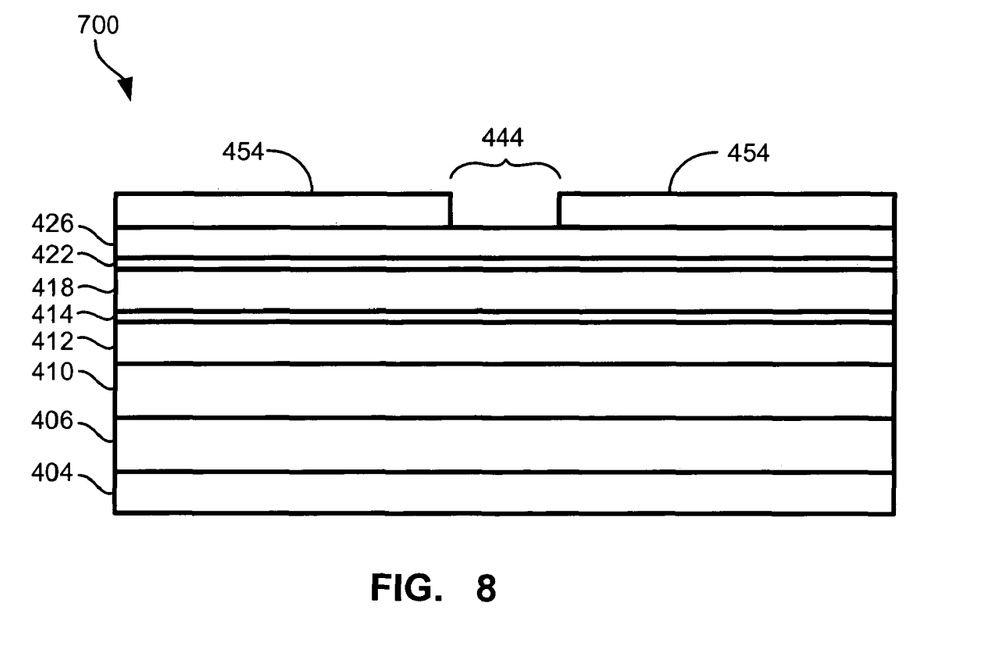
FIG. 8 illustrates the wafer stack of FIG. 7 after the addition of leads.

Leads 454 are formed on the wafer stack 700 with a gap between the leads 454 defining the active area 444 of the read head, as shown in FIG. 8. Processes that can be used to form the leads 454 include additive and subtractive processes. One additive process includes a patterning process in which a lithography mask (not shown) is added to the wafer stack 700 and conductive material is added to form the leads 454. Then the lithography mask is removed from the wafer stack 700, leaving a gap between the leads 454. According to a subtractive process, lead material is added to the wafer stack 700 and material is removed from the lead material to define a gap above the active area 444 with leads 454 on opposite sides thereof. A preferred method for removing the lead material from the gap area is Reactive Ion Etching (RIE).

Figure 9:
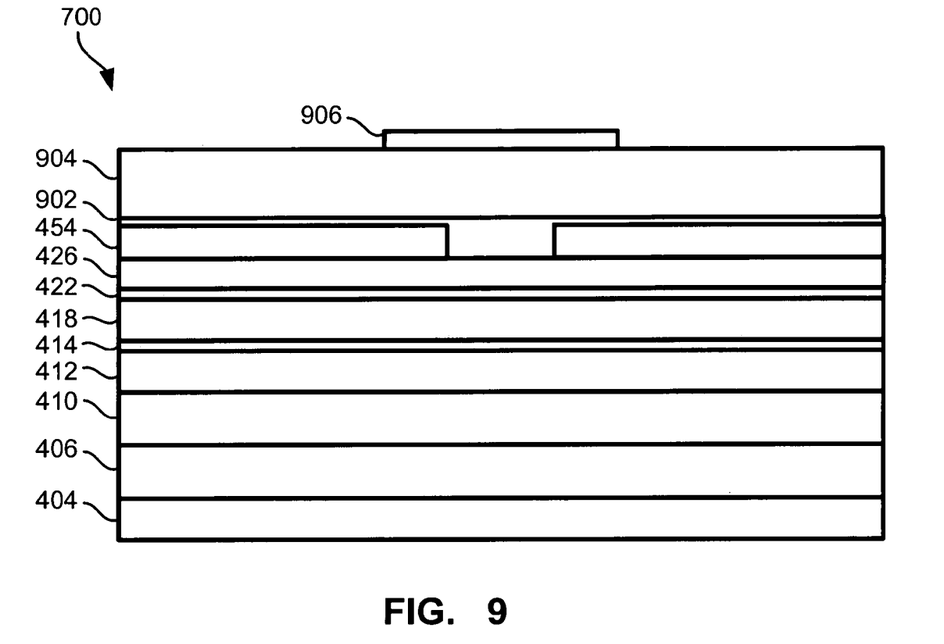
FIG. 9 illustrates the wafer stack of FIG. 8 after the addition of a resist undercoat and imaging resist.

As shown in FIG. 9, a resist undercoat 902 is applied to the wafer stack 700, filling the gap between the leads 454 and coating the leads 454. An imaging resist 904 is deposited on top of the undercoat 902. A preferred resist undercoat 902 is polymethylglutarimide (PMGI) available from Micro-Chem Corp., 1254 Chestnut Street, Newton, Mass. 02464, USA. PMGI is virtually insoluble in typical photoresist solvents; therefore i-line, deep UV and e-beam resists can be placed on top of PMGI without intermixing.

Figure 10:
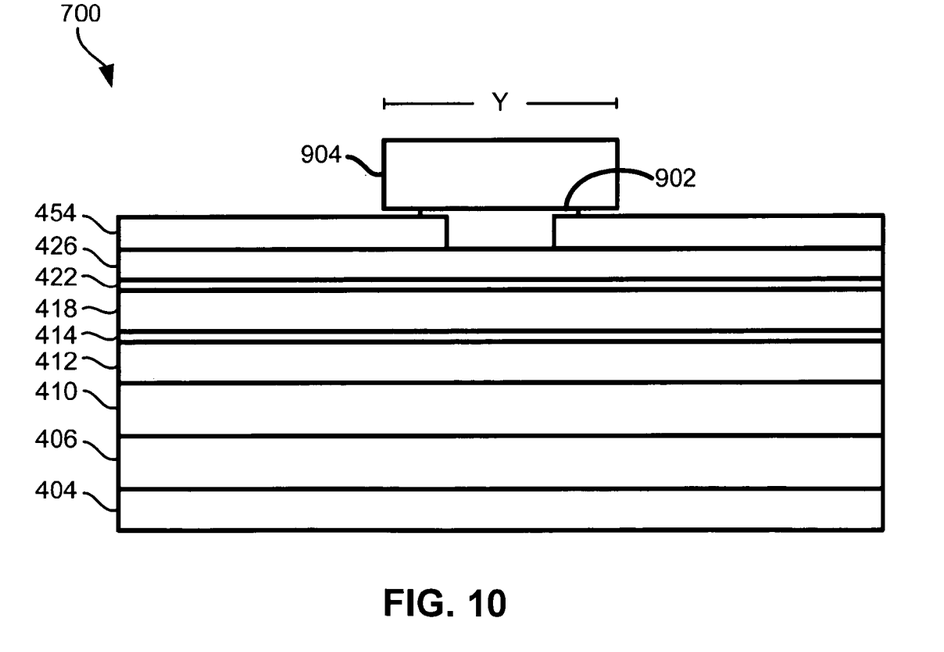
FIG. 10 illustrates the wafer stack of FIG. 9 after the removal of a portion of the resist undercoat and imaging resist.

Material is removed from the layer of imaging resist 904 and material is also removed from the PMGI undercoat 902, as shown in FIG. 10. Any suitable process can be used to remove the side regions of the undercoat 902 and imaging resist 904. Preferably, a lithography mask 906 is added to the wafer stack 700 and developer is added to the wafer stack 700. PMGI resist is readily soluble in most standard alkaline photoresist developers. The developer cuts the layer of imaging resist 904 to width Y and also cuts the PMGI undercoat 902 so that it undercuts the layer of imaging resist 904. This undercutting makes the undercoat 902 easier to detach from the stack 700.

Figure 11:
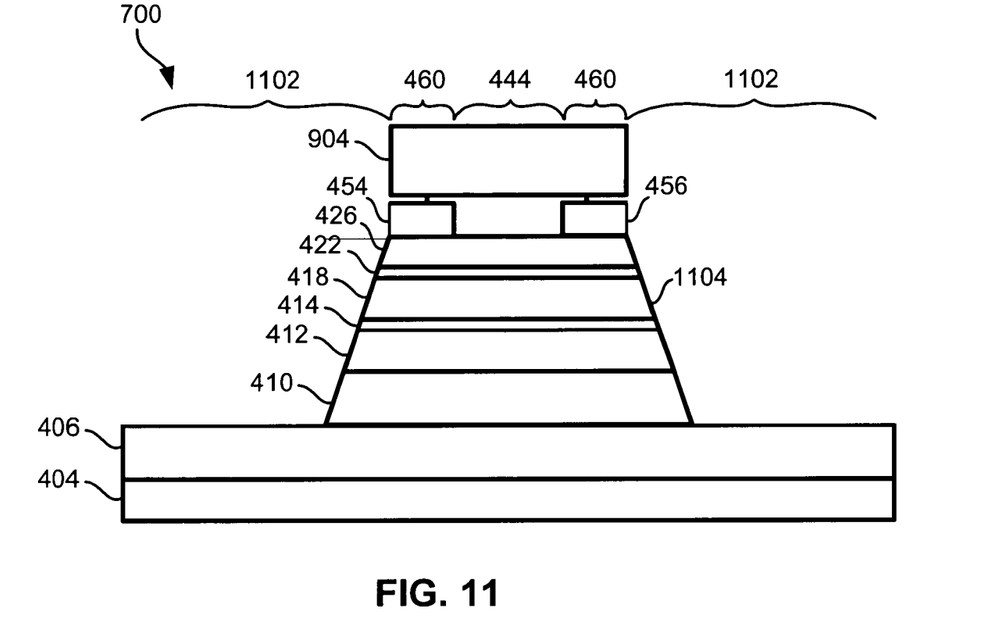
FIG. 11 illustrates the wafer stack of FIG. 10 after the removal of side areas of the wafer stack.

The imaging resist 904 on top is used as a mask of width Y for ion milling/RIE or sputter etching to remove side areas 1102 of the wafer stack 700, resulting in the structure shown in FIG. 11. Preferably, edges 1104 of the side areas of the wafer stack after removing the material taper towards each other in a direction away from the wafer stack. End portions 456 of the leads 454 in the overlay regions 460 are defined during this processing step.

Figure 12:
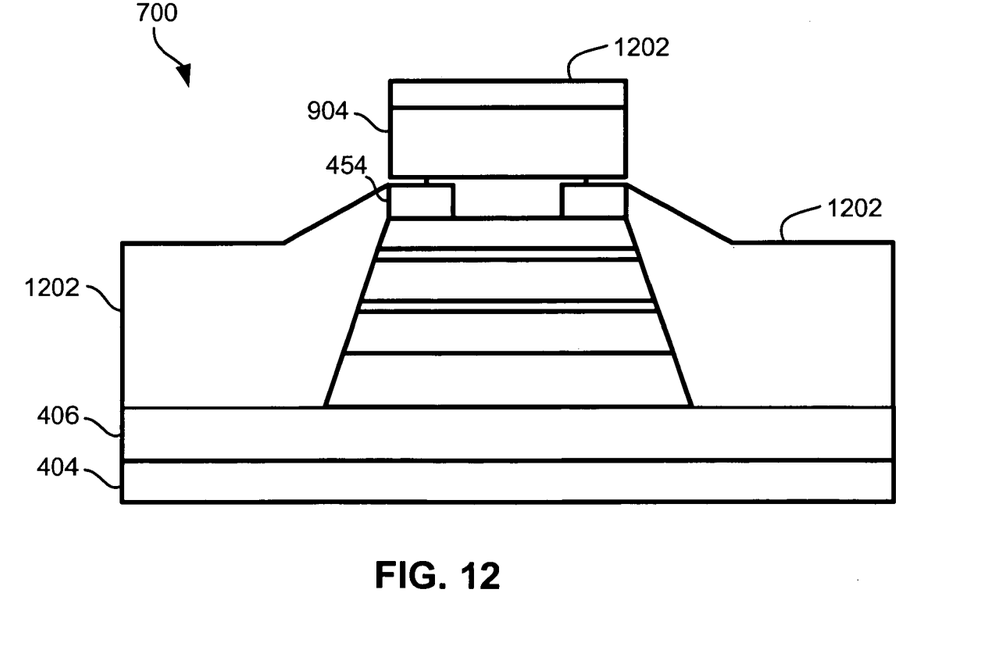
FIG. 12 illustrates the wafer stack of FIG. 11 after the addition of lead material to side areas of the wafer stack.
Figure 13:
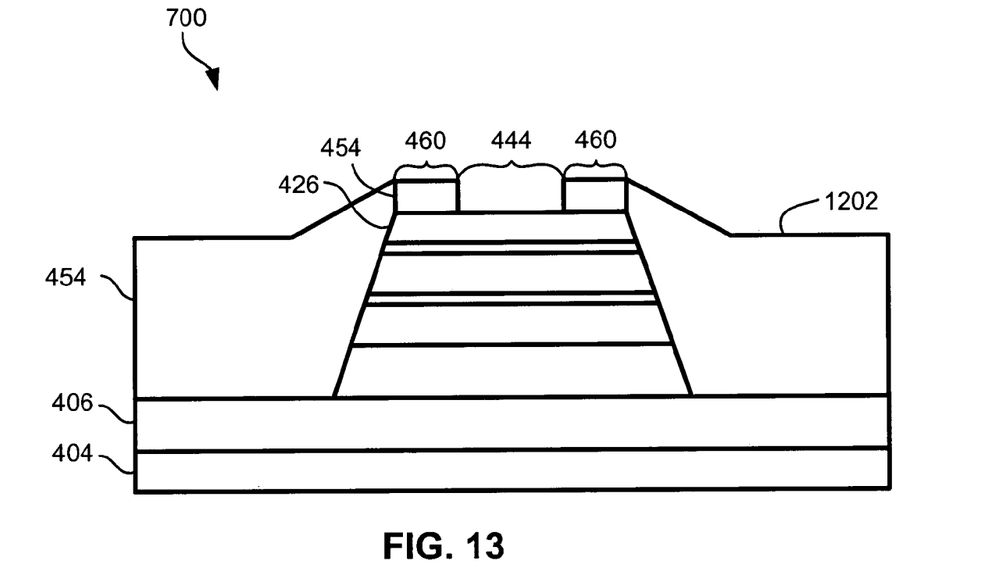
FIG. 13 illustrates the wafer stack of FIG. 12 after the removal of the remaining portions of the resist undercoat and imaging resist.

As shown in FIG. 12, a conductive metal 1202 forming extensions to the leads 454 is added to the wafer stack 700 using any suitable process, such as deposition. Then a lift off process is used to remove the resist undercoat 902 and imaging resist 904, leaving the wafer stack 700 shown in FIG. 13.

Figure 14:
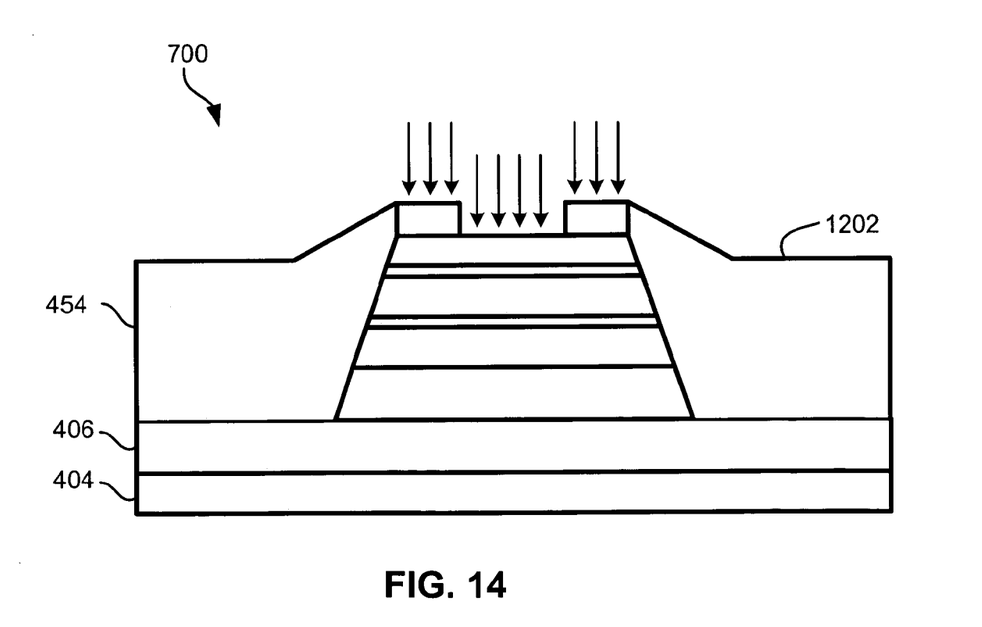
FIG. 14 illustrates processing of the wafer stack of FIG. 13 for reducing the magnetic properties of the central portion of the bias layer.
Figure 15:
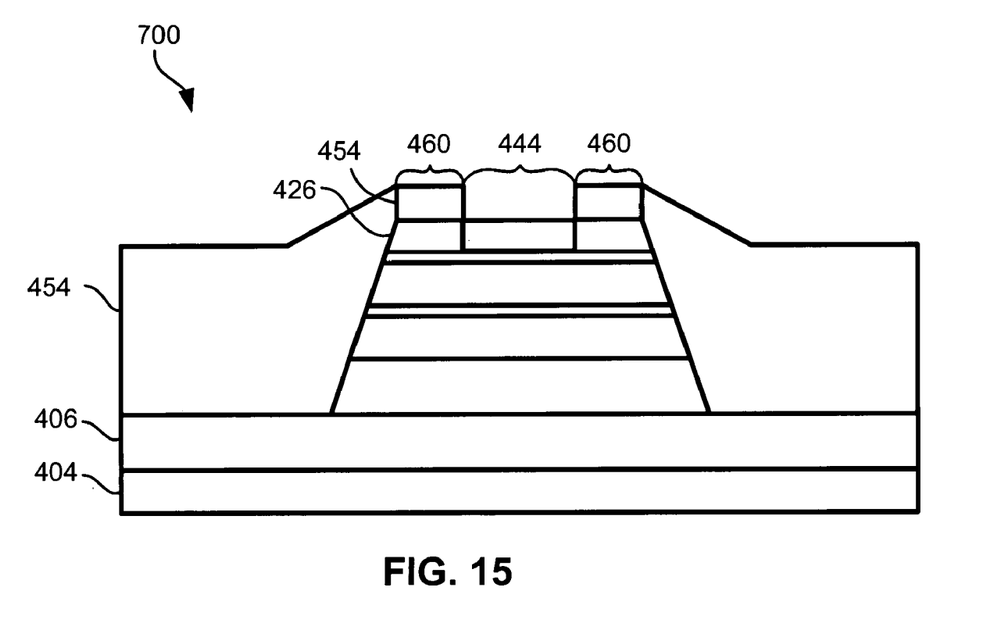
FIG. 15 illustrates a final lead overlay read head with pinned tab regions according to one embodiment.

As depicted in FIG. 14, a processing step is performed to effectively "kill" the magnetic property of the bias layer 426 in the active region (between the overlap regions). By "killing" the magnetic property of the bias layer 426 in the active region 444, what is meant is that the magnetic properties of the central portion of the bias layer 426 (between the leads) are destroyed or otherwise rendered ineffective to substantially pin the free layer. FIG. 15 illustrates the final wafer stack 700, in which the magnetic properties of the bias layer 426 in the active region 444 are substantially ineffective. The magnetic moments of the end portions 456 of the free layer are pinned antiparallel to the magnetic moments of the end portions of the bias layer 426. The end portions of the bias and free layers are preferably in the overlay region 460.

The portions of the leads 454 in the overlay regions 460 forms a mask for whichever process is selected to kill the active area. Use of the material in the overlay regions 460 can be referred to as self-alignment and resulting processing can be referred to as self-aligned oxidation, self-aligned ion implantation, self-aligned milling, etc. This saves a processing step in that an additional mask does not need to be added to the wafer stack 700. Preferred processes to kill the magnetic property of the bias layer 426 in the active region include oxidation, ion implantation and milling. In an exemplary oxidation process, plasma is used to implant oxygen in the bias layer 426. Note that an inert material (not shown) can be added to the leads 454 to protect the leads 454. In an illustrative ion implantation process, ions such as oxygen ions are implanted into the bias layer 426 using a RIE-like process. In an exemplary milling process, sputtering is used to remove enough material from the bias layer 426 to make its pinning properties in the active area ineffective.

According to one embodiment, end regions of the leads 454 taper towards facing ends thereof. Preferably, a thickness of the bias layer in a direction perpendicular to a plane parallel to an upper surface of the wafer stack is less than a thickness of the free layer in the same direction. Ideally, the thickness of the bias layer is less than 75% of the thickness of the free layer.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A method for creating a magnetic head, comprising:
adding leads to a wafer stack having a free layer, a bias layer, and a spacer layer between the free layer and bias layer, wherein a gap is formed between the leads;
adding a protective layer to the wafer stack such that the gap is covered, the protective layer also covering facing ends of the leads;
removing material from at least one side area of the wafer stack using the protective layer as a mask;
removing the protective layer; and
processing a portion of the bias layer below the gap for reducing a magnetic moment of the bias layer in the portion of the bias layer below the gap for forming a sensor in which magnetic moments of end portions of the free layer are pinned by magnetic moments of end portions of the bias layer.

2. The method as recited in claim 1, wherein the magnetic moments of the end portions of the free layer are pinned antiparallel to the magnetic moments of the end portions of the bias layer.

3. The method as recited in claim 1, wherein the leads are added to the wafer stack by an additive process.

4. The method as recited in claim 1, wherein the gap is formed between the leads by reactive ion etching.

5. The method as recited in claim 1, wherein the protective layer includes a resist undercoat and a second layer of resist above the resist undercoat.

6. The method as recited in claim 5, further comprising applying a developer to the resist undercoat for removing a portion of the resist undercoat such that opposite ends of the resist undercoat along a plane parallel to an upper surface of the wafer stack are closer together than opposite ends of the second layer of resist.

7. The method as recited in claim 1, wherein the material in the at least one side area of the wafer stack is removed by at least one of ion milling and sputter etching.

8. The method as recited in claim 1, wherein an edge of the at least one side area of the wafer stack after removing the material is oriented at an acute angle relative to a line perpendicular to a plane parallel to an upper surface of the wafer stack.

9. The method as recited in claim 1, wherein material is removed from both side areas of the wafer stack, wherein edges of the side areas of the wafer stack after removing the material taper towards each other in a direction away from the wafer stack.

10. The method as recited in claim 1, wherein the protective layer is removed by a lift off process.

11. The method as recited in claim 1, further comprising adding lead material to the at least one side area of the wafer stack.

12. The method as recited in claim 1, wherein the magnetic moment of the bias layer is reduced by oxidation.

13. The method as recited in claim 1, wherein the magnetic moment of the bias layer is reduced by ion implantation.

14. The method as recited in claim 1, wherein the magnetic moment of the bias layer is reduced by milling.

15. The method as recited in claim 1, wherein the magnetic moment of the bias layer is reduced by at least one of self-aligned oxidation, self-aligned ion implantation and self-aligned milling.

16. A method for creating a magnetic head, comprising:
adding leads to a wafer stack having a free layer, a bias layer, and a spacer layer between the free layer and bias layer, wherein a gap is formed between the leads;
adding a protective layer to the wafer stack such that the gap is covered, the protective layer also covering facing end regions of the leads;
removing material from at least one side area of the wafer stack using the protective layer as a mask, wherein the protective layer includes a resist undercoat and a second layer of resist above the resist undercoat;
applying a developer to the resist undercoat for removing a portion of the resist undercoat such that opposite ends of the resist undercoat along a plane parallel to an upper surface of the wafer stack are closer together than opposite ends of the second layer of resist;
removing the protective layer; and
processing a portion of the bias layer below the gap for reducing a magnetic moment of the bias layer in the portion of the bias layer below the gap for forming a sensor in which magnetic moments of end portions of the free layer are pinned antiparallel to magnetic moments of end portions of the bias layer.

17. The method as recited in claim 16, wherein the magnetic moments of the end portions of the free layer are pinned antiparallel to the magnetic moments of the end portions of the bias layer.

18. The method as recited in claim 16, wherein the leads are added to the wafer stack by an additive process.

19. The method as recited in claim 16, wherein the gap is formed between the leads by reactive ion etching.

20. The method as recited in claim 16, wherein the material in the at least one side area of the wafer stack is removed by at least one of ion milling and sputter etching.

21. The method as recited in claim 16, wherein an edge of the at least one side area of the wafer stack after removing the material is oriented at an acute angle relative to a line perpendicular to a plane parallel to an upper surface of the wafer stack.

22. The method as recited in claim 16, wherein material is removed from both side areas of the wafer stack, wherein edges of the side areas of the wafer stack after removing the material taper towards each other in a direction away from the wafer stack.

23. The method as recited in claim 16, wherein the protective layer is removed by a lift off process.

24. The method as recited in claim 16, further comprising adding lead material to the at least one side area of the wafer stack.

25. The method as recited in claim 16, wherein the magnetic moment of the bias layer is reduced by oxidation.

26. The method as recited in claim 16, wherein the magnetic moment of the bias layer is reduced by ion implantation.

27. The method as recited in claim 16, wherein the magnetic moment of the bias layer is reduced by milling.

* * * * *